(12) United States Patent
Kim et al.

(10) Patent No.: US 7,401,494 B2
(45) Date of Patent: Jul. 22, 2008

(54) VALVE TEST APPARATUS AND METHODS FOR TESTING A SOLENOID VALVE OR A VENTURI VALVE

(75) Inventors: Soo-Min Kim, Hwaseong-si (KR); Ho-Sung Eum, Yongin-si (KR); Jang-Wan Cho, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 180 days.

(21) Appl. No.: 11/490,128

(22) Filed: Jul. 21, 2006

(65) Prior Publication Data
US 2007/0028665 A1    Feb. 8, 2007

(30) Foreign Application Priority Data
Aug. 2, 2005    (KR)    .................. 10-2005-0070691

(51) Int. Cl.
*G01N 27/00*    (2006.01)
*G01L 13/00*    (2006.01)
(52) U.S. Cl. .................. 73/1.72; 73/49.7; 73/118.1
(58) Field of Classification Search .................. 73/1.72, 73/49.7, 118.1, 865.6
See application file for complete search history.

(56) References Cited

U.S. PATENT DOCUMENTS

| | | | | |
|---|---|---|---|---|
| 3,131,558 | A * | 5/1964 | Davis .............................. | 73/40 |
| 4,432,227 | A * | 2/1984 | Dunn ........................... | 73/49.8 |
| 4,587,836 | A * | 5/1986 | Hewlett ........................ | 73/49.8 |
| 4,766,765 | A * | 8/1988 | Ezekoye ........................ | 73/168 |
| 4,893,494 | A * | 1/1990 | Hart ............................. | 73/1.69 |
| 5,020,564 | A * | 6/1991 | Thoman et al. .............. | 137/102 |
| 5,048,329 | A * | 9/1991 | Marchini ...................... | 73/168 |
| 5,113,705 | A * | 5/1992 | Earnhardt .................... | 73/168 |
| 5,454,273 | A * | 10/1995 | Smith .................. | 733/862.191 |
| 5,694,808 | A * | 12/1997 | Weis ............................ | 73/168 |
| 6,038,918 | A * | 3/2000 | Newton ..................... | 73/118.1 |
| 7,076,997 | B2 * | 7/2006 | Dunbar et al. ............. | 73/118.1 |

(Continued)

FOREIGN PATENT DOCUMENTS

FR        2755226 A1 *    4/1998

(Continued)

*Primary Examiner*—Hezron E. Williams
*Assistant Examiner*—David A. Rogers
(74) *Attorney, Agent, or Firm*—Harness, Dickey & Pierce, P.L.C.

(57) ABSTRACT

A valve test apparatus, a solenoid valve test method and a venturi valve test method are provided. The valve test apparatus may include a gas supply unit, a solenoid valve holding unit, a first measurement unit, a venturi valve holding unit, a second measurement unit, a timer unit and/or a power supply unit. The solenoid valve holding unit may be connected to one end of the gas supply unit. The first measurement unit may be connected to the solenoid valve holding unit. The venturi valve holding unit, on which a venturi valve to be tested may be arranged. The venturi valve may be selectively connected to the solenoid valve holding unit together with the first measurement unit. The second measurement unit may be connected to the venturi valve. The timer unit may measure a time interval between when the solenoid valve is activated and when a measured value by the first measurement unit or second measurement unit is equivalent to a desired value.

12 Claims, 7 Drawing Sheets

U.S. PATENT DOCUMENTS 7,210,338 B2 * 5/2007 Baird et al. .................. 73/49.7
2006/0048565 A1 * 3/2006 Rutschmann et al. ..... 73/119 R

FOREIGN PATENT DOCUMENTS

| | | | |
|---|---|---|---|
| GB | 2117095 A * | 10/1983 | |
| GB | 2360078 A * | 9/2001 | |
| JP | 11-111684 | 4/1999 | |
| KR | 10-1998-0017531 | 6/1998 | |
| KR | 10-2004-0042959 | 5/2004 | |
| KR | 10-2004-0051671 | 6/2004 | |
| SU | 1742665 A1 * | 6/1992 | |
| SU | 1768806 A1 * | 10/1992 | |
| WO | WO 2004083650 A1 * | 9/2004 | |

* cited by examiner

VALVE TEST APPARATUS AND METHODS FOR TESTING A SOLENOID VALVE OR A VENTURI VALVE

PRIORITY STATEMENT

This application claims the benefit of priority under 35 U.S.C. § 119 from Korean Patent Application No. 10-2005-0070691 filed on Aug. 2, 2005, in the Korean Intellectual Property Office, the disclosure of which is incorporated herein by reference in its entirety.

BACKGROUND OF THE INVENTION

1. Field of the Invention

Example embodiments of the present invention relate to a valve test apparatus. Other example embodiments of the present invention relate to a valve test apparatus which is capable of testing whether a solenoid or venturi valve is operating normally, a solenoid valve test method and a venturi valve test method.

2. Description of the Related Art

Solenoid valves and venturi valves, which are widely used in semiconductor manufacturing equipment, control the flow of various gases. After prolonged use of such valves, reactive gas particles may be deposited on the inner surface of the valves, in which case, the valves may not operate properly.

When semiconductor manufacturing equipment equipped with a solenoid valve or a venturi valve is determined to be defective, it is difficult to determine whether the cause of the defective semiconductor manufacturing equipment is due to a defective solenoid valve or venturi valve until replacing the solenoid valve or a venturi valve with a new valve. Conventionally, in order to determine whether the semiconductor manufacturing equipment is operating normally, the solenoid valve or venturi valve may be replaced with a new valve. The solenoid valve or the venturi valve may sometimes still be replaced with a new valve, even when the valve is functioning properly. Valve replacement is costly and inefficient, lowering productivity.

In the case of solenoid valves, which are generally used in precision machinery, it takes a shorter amount of time to control the solenoid valves to supply gas. It may be desirous to determine how the amount of time it takes to drive solenoid valves after applying power to the solenoid valves. It may be difficult to precisely measure the time taken for the solenoid valves to actually begin operating. Hence, it may be difficult to determine whether semiconductor manufacturing equipment equipped with the solenoid valves is operating normally.

SUMMARY OF THE INVENTION

Example embodiments of the present invention provide a valve test apparatus. Other example embodiments of the present invention provide a valve test apparatus which is capable of testing whether a solenoid valve or a venturi valve is operating normally.

In yet other example embodiments of the present invention, a valve test method for testing whether a solenoid valve or a venturi valve is operating normally is provided.

The above stated example embodiments as well as other objects, features and advantages, of the present invention will become clear to those skilled in the art upon review of the following description.

According to an example embodiment of the present invention, there is provided a valve test apparatus that may include a gas supply unit, a solenoid valve holding unit, a first measurement unit, a venturi valve holding unit, a second measurement unit a timer unit and/or a power supply unit. The solenoid valve holding unit may be connected to one end of the gas supply unit. The first measurement unit may be connected to the solenoid valve holding unit. A venturi valve to be tested may be arranged on the venturi valve holding unit. The venturi valve may be selectively connected to the solenoid valve holding unit and/or the first measurement unit. The second measurement unit may be connected to the venturi valve. The timer unit may measure a time interval between when the solenoid valve is activated and when a measured value by the first measurement unit or the second measurement unit is equivalent to a desired value.

According to other example embodiments of the present invention, there is provided a solenoid valve test method that may include arranging a solenoid valve to be tested on a solenoid valve holding unit, enabling a gas supply unit to supply gas to the solenoid valve, measuring a flow of gas discharged from the solenoid valve and/or measuring a time interval between when the solenoid valve is activated and when a measured value, equivalent to a desired value, is detected from the solenoid valve.

According to still other example embodiments of the present invention, there is provided a venturi valve test method that may include arranging a solenoid valve operating normally on a solenoid valve holding unit, arranging a venturi valve to be tested on a venturi valve holding unit, enabling a gas supply unit to supply gas to the solenoid valve and/or measuring the vacuum pressure inside the venturi valve when gas discharged from the solenoid valve passes through the venturi valve.

BRIEF DESCRIPTION OF THE DRAWINGS

Example embodiments of the present invention will become readily apparent by reference to the following detailed description when considering in conjunction with the accompanying drawings. FIGS. 1-7 represent non-limiting, example embodiments of the present invention as described herein.

FIG. 3 is a perspective view illustrating a valve test apparatus according to an example embodiment of the present invention;

FIG. 4 is a diagram illustrating the testing of a valve using a first measurement unit of a valve test apparatus according to an example embodiment of the present invention;

FIG. 5 is a diagram illustrating the test of a valve using a second measurement unit of a valve test apparatus according to an example embodiment of the present invention;

FIG. 6 is a flowchart illustrating a solenoid valve test method using a valve test apparatus according to an example embodiment of the present invention; and FIG. 7 is a flowchart illustrating a venturi valve test method using a valve test apparatus according to an example embodiment of the present invention.

DETAILED DESCRIPTION OF EXAMPLE EMBODIMENTS

Figure 1A:
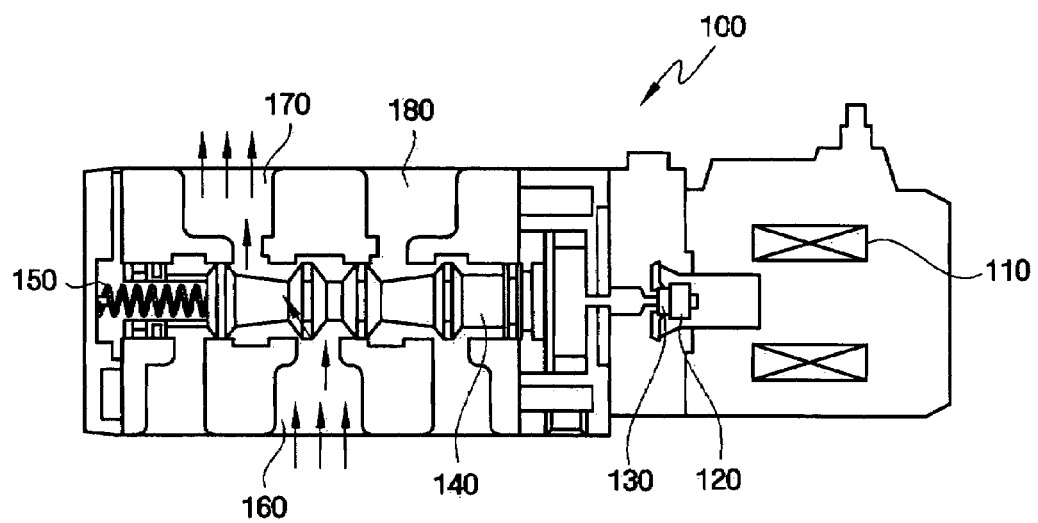
FIG. 1A is a diagram illustrating a solenoid valve turned off according to the conventional art.

Various example embodiments of the present invention will now be described more fully with reference to the accompanying drawings in which some example embodiments of the invention are shown. In the drawings, the thicknesses of layers and regions may be exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the scope of example embodiments of the present invention.

Spatially relative terms, such as "beneath", "below", "lower", "above", "upper" and the like, may be used herein for ease of description to describe one element or a feature's relationship to another element or feature as illustrated in the Figures. It will be understood that the spatially relative terms are intended to encompass different orientations of the device in use or operation in addition to the orientation depicted in the Figures. For example, if the device in the Figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

Example embodiments of the present invention are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments of the invention should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope of the present invention.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments of the present invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention will now be described more fully with reference to the accompanying drawings, in which preferred embodiments of the invention are shown. However, the present invention is not limited to the example embodiments described.

A solenoid valve 100 testable by a valve test apparatus according to an example embodiment of the present invention will now be described with reference to FIGS. 1A and 1B.

FIG. 1A is a diagram of a solenoid valve turned off according to the conventional art. FIG. 1B is a diagram of a solenoid valve turned on according to the conventional art.

Figure 1B:
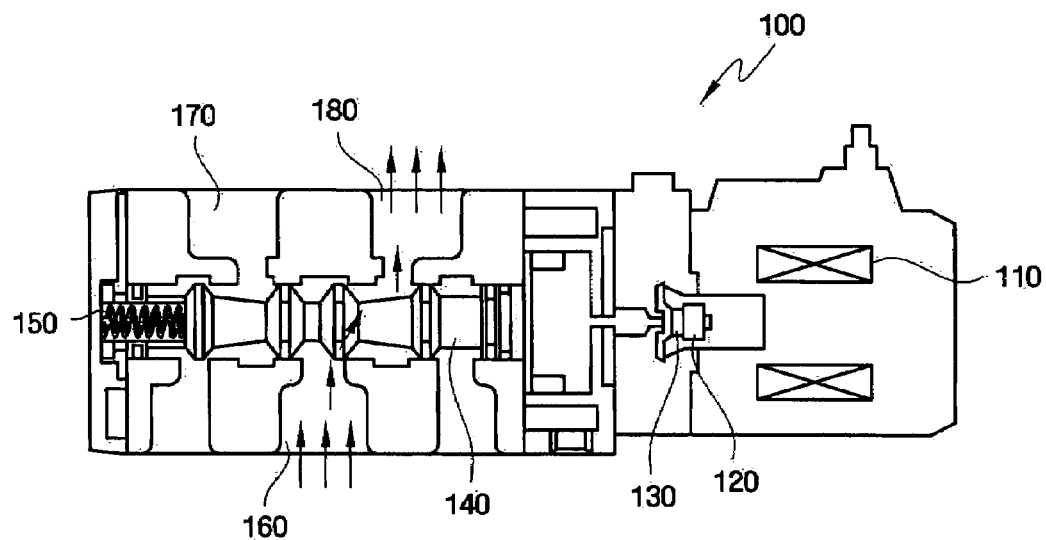
FIG. 1B is a diagram illustrating a solenoid valve turned on according to the conventional art.

Referring to FIGS. 1A and 1B, the solenoid valve 100 may include an electromagnet coil 110, a plunger 120, a valve orifice 130, a poppet 140 and/or a spring 150.

The electromagnet coil 110 may be connected to a power supply unit. When a current flows into the electromagnet coil 110 in response to an electrical signal, the electromagnet coil 110 may generate a magnetic force, moving the plunger 120.

The plunger 120 may be an iron pin that closes the valve orifice 130. The plunger 120 may close the valve orifice 130 when power is not supplied thereto. When a magnetic force is generated by a current flowing into the electromagnet coil 110, the plunger 120 may move toward the electromagnet coil 110, opening the valve orifice 130.

The valve orifice 130 initially may be closed by the plunger 120 and may be opened when the plunger 120 is moved away due to the magnetic force. The valve orifice 130 may be connected to a gas inlet 160. When the valve orifice 130 is opened, a gas may be pumped into the solenoid valve 100 via the gas inlet 160.

The poppet 140 may direct the passage of gas pumped into the solenoid valve 100 via the gas inlet 160. The valve orifice 130 may be connected to one end of the poppet 140, and the spring 150 may be connected to another end of the poppet 140. The poppet 140 may direct the passage of the gas pumped into the solenoid valve 100 via the gas inlet 160 while moving along a gas pumped into the solenoid valve 100 via the valve orifice 130. Thus, a first gas outlet 170 or a second gas outlet 180 may be opened according to the movement of the poppet 140 in a lateral direction.

The spring 150 may be connected to the poppet 140 and may push the poppet 140 away with its elastic force. When a gas is pumped at a higher pressure into the solenoid valve 100 via the valve orifice 130 than the pressure generated by the elastic force of the spring 150, the poppet 140 may be pushed toward the spring 150 by the gas. When no gas is pumped into the solenoid valve 100, the spring 150 may push the poppet 140 back toward the valve orifice 130, controlling the passage of gas.

The operation of the solenoid valve 100 will now be described in detail with reference to FIGS. 1A and 1B.

Referring to FIG. 1A, when the solenoid valve 100 is not yet activated, the plunger 120 may close the valve orifice 130. When the solenoid valve 100 is not yet activated, the poppet 140 may be pushed away from the spring 150 due to the elastic force of the spring 150, positioning the poppet 140 near the valve orifice 130. When a gas is pumped into the solenoid valve 100 via the gas inlet 160, the gas may be discharged through the first gas outlet 170.

Referring to FIG. 1B, when the solenoid valve 100 is activated, a magnetic force may be generated by a current flowing into the electromagnet coil 110. The magnetic force may move the plunger 120, which closes the valve orifice 130 such that the valve orifice 130 may be opened. Because the valve orifice 130 connects to the gas inlet 160, a gas may be pumped into the solenoid valve 100 via the gas inlet 160 when the valve orifice 130 is opened. When the gas is pumped into the solenoid valve 100 via the gas inlet 160, the poppet 140 may be affected by the pressure of the gas. When the pressure of the gas becomes higher than the pressure generated by the elastic force of the spring 150 connected to the poppet 140, the poppet 140 may move toward the spring 150. The first gas outlet 170 may be closed by the poppet 140, and the second gas outlet 180 may be opened. When a gas is pumped into the solenoid valve 100 via the gas inlet 160, the gas may be discharged through the second gas outlet 180.

Figure 2A:
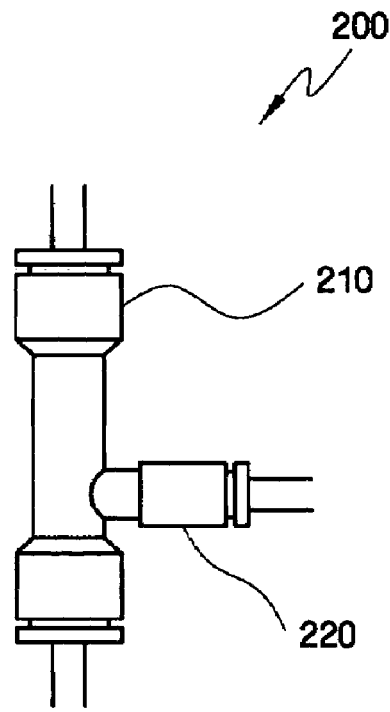
FIG. 2A is a front view illustrating a venturi valve according to the conventional art.
Figure 2B:
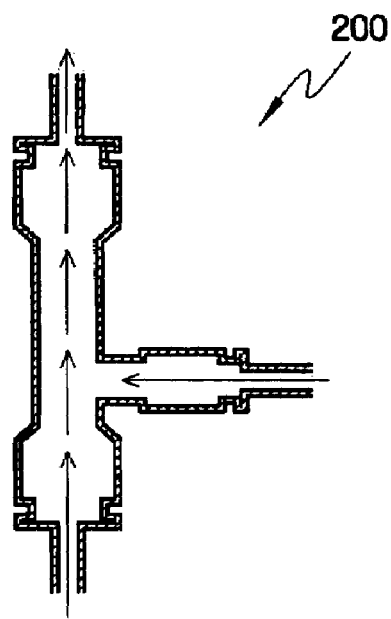
FIG. 2B is a cross-sectional view of the venturi valve of FIG. 2A.

A venturi valve 200 testable by a valve test apparatus according to an example embodiment of the present invention will now be described in detail with reference to FIGS. 2A and 2B. FIG. 2A is a front view of a venturi valve according to the conventional art. FIG. 2B is a cross-sectional view of the venturi valve of FIG. 2A.

Referring to FIGS. 2A and 2B, the venturi valve 200 is a shorter valve with middle portions that may be narrower than end portions. The venturi value 200 may be used for measuring a gas flow. The venturi valve 200 may include a first pipe 210, which is formed in the shape of a dumbbell, and a second pipe 220, which has a smaller diameter than the first pipe 210. The second pipe 220 may be connected to one side of the first pipe 210.

When a gas passes through relatively thin portions of the first pipe 210, a rate flow of the gas may increase, decreasing a pressure inside the first pipe 210. When the air pressure inside the first pipe 210 decreases, a gas filling up the second pipe 220 may be sucked into the first pipe 210, decreasing the pressure inside the second pipe 220. The gas flow inside the venturi valve 200 may be measured based on the vacuum pressure inside the second pipe 220.

A valve test apparatus according to an example embodiment of the present invention will now be described in detail with reference to FIGS. 3 through 5.

Figure 3:
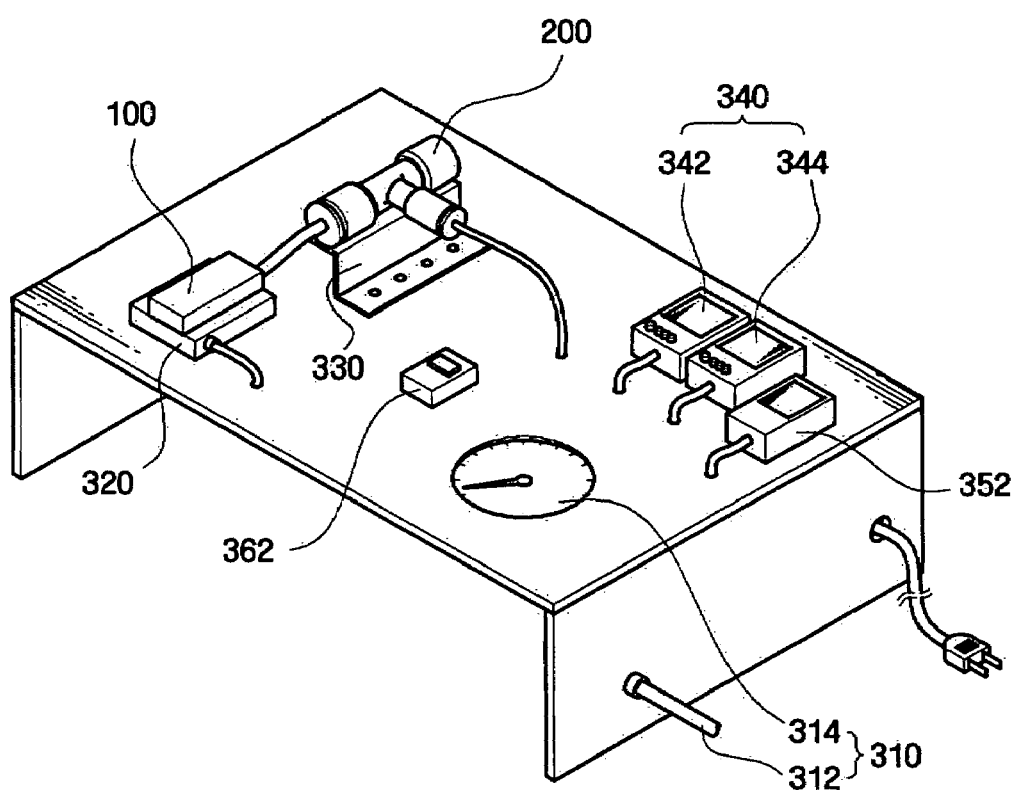

FIG. 3 is a perspective view of a valve test apparatus according to an example embodiment of the present invention. FIG. 4 is a diagram illustrating the testing of a valve using a first measurement unit of a valve test apparatus according to an example embodiment of the present invention. FIG. 5 is a diagram illustrating the testing of a valve using a second measurement unit of a valve test apparatus according to an example embodiment of the present invention.

Figure 4:
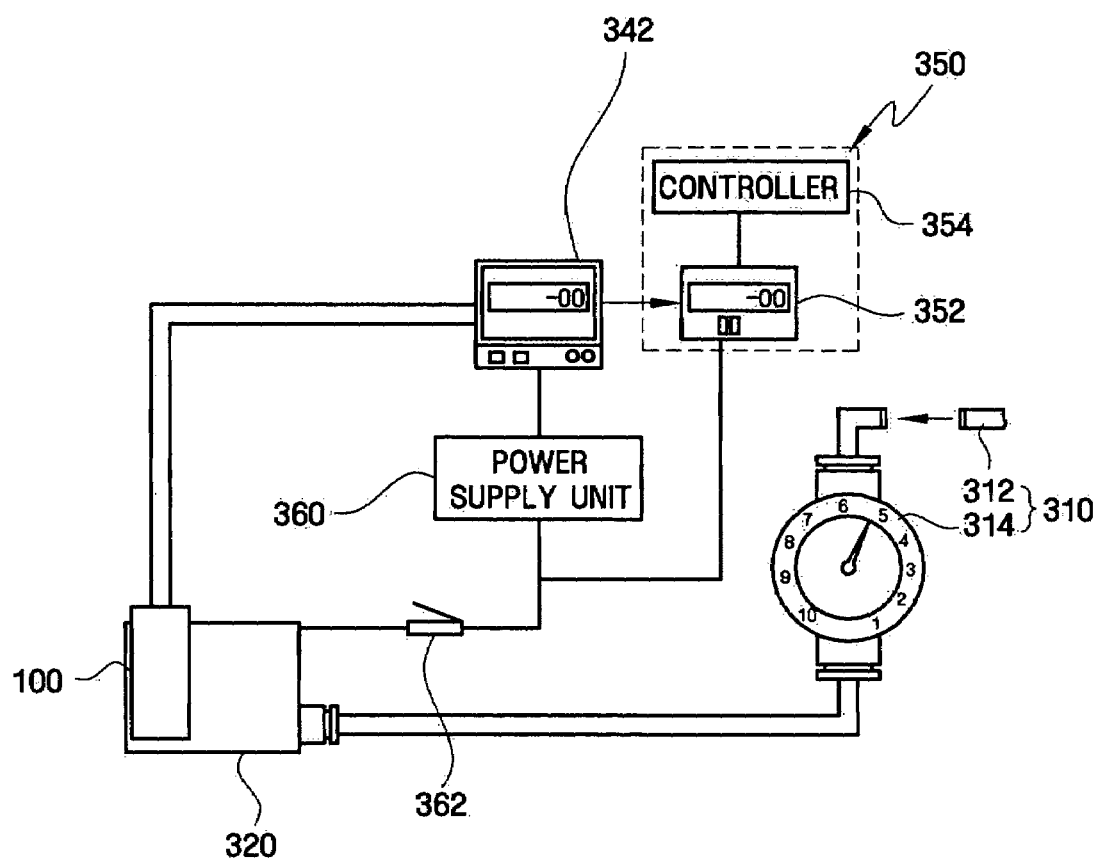
Figure 5:
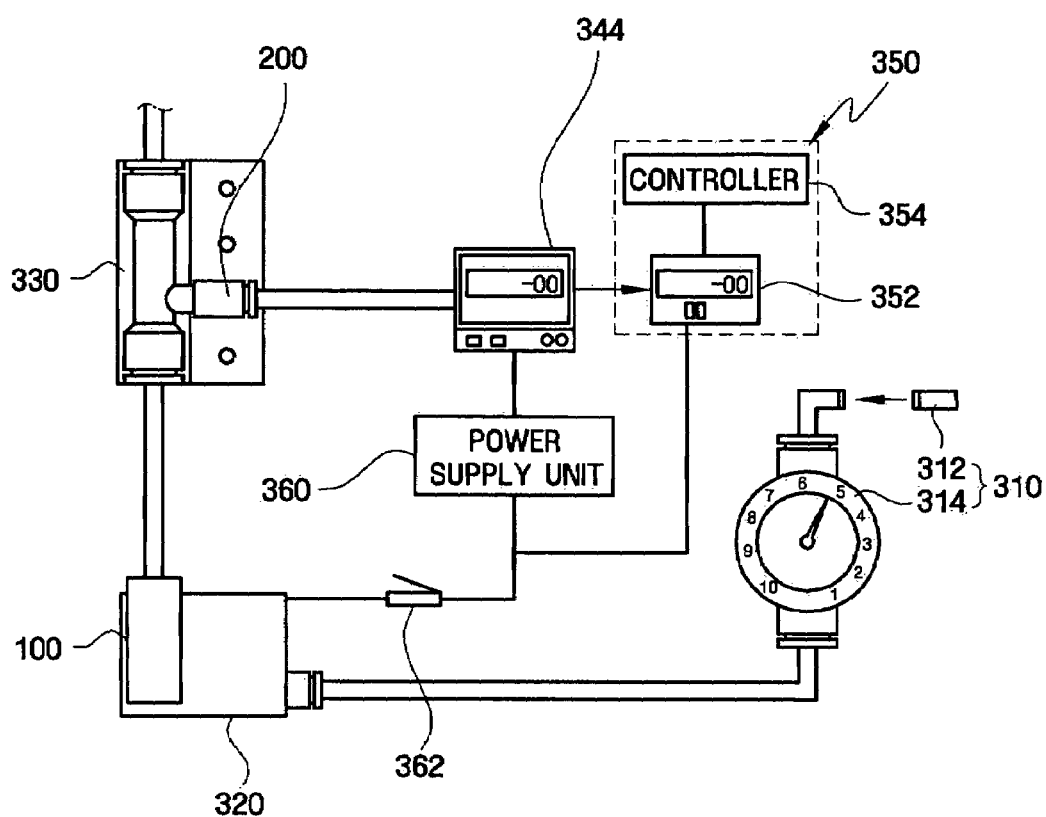

Referring to FIGS. 3 through 5, the valve test apparatus may include a gas supply unit 310, a solenoid valve holding unit 320, a venturi valve holding unit 330, a measurement unit 340, a timer unit 350 and/or a power supply unit 360.

The gas supply unit 310 supplies gas to the valve test apparatus. The gas supply unit 310 may connect to the solenoid valve holding unit 320. The gas supply unit 310 may include a gas pipe 312 through which gas may be supplied by the gas supply unit 310. The gas supply unit 310 may also include a regulator 314, which regulates the pressure of gas provided by the gas supply unit 310. The gas supply unit 310 may supply gas to the valve test apparatus while regulating, or uniformly maintaining, the pressure of the gas with the aid of the regulator 314.

A solenoid valve 100 may be arranged on the solenoid valve holding unit 320. One end of the solenoid valve holding unit 320 may be connected to one end of the gas supply unit 310. The other end of the solenoid valve holding unit 320 may be connected to a venturi valve 200 or a first measurement unit 342. The solenoid valve holding unit 320 may include a plurality of holes (not shown) through which gas may be pumped into or discharged from the solenoid valve 100.

The venturi valve 200 may be arranged on the venturi valve holding unit 230. The venturi valve 200 may be connected to the solenoid valve holding unit 320 and a second measurement unit 344.

The measurement unit 340 may measure the pressure of gas discharged from the solenoid valve 100 and/or the vacuum pressure inside the venturi valve 200. The measurement unit 340 may include the first measurement unit 342 and/or the second measurement unit 344. The first measurement unit 342 may be a pressure measurement unit for measuring the pressure of gas discharged from the solenoid valve 100. The second measurement unit 344 may be a vacuum pressure measurement unit for measuring the vacuum pressure inside the venturi valve 200.

When testing the solenoid valve 100, the flow of gas discharged from the solenoid valve 100 may be determined based on the pressure of the gas discharged from the solenoid valve 100. The pressure of the gas may be measured by the first measurement unit 342.

Alternatively, the venturi valve 200 may be connected to the solenoid valve holding unit 320. The vacuum pressure inside the venturi valve 200 may be measured using the second measurement unit 344. When testing the venturi valve 200, the venturi valve 200 may be connected to the second measurement unit 344 such that the second measurement unit 344 measures the vacuum pressure inside the venturi valve 200.

The timer unit 350 may determine how quickly the solenoid valve 100 starts operating. For example, the timer unit 350 may determine the amount of time it takes for the measurement unit 340 to detect a desired (or predetermined or expected) value after the solenoid valve is activated.

The desired value is an expected or desired value that may be detected from the solenoid valve 100 when the solenoid valve 100 operates normally. The desired value may be input to a timer 352 in advance. The desired value is a minimum measured value that may be detected from a normally operating solenoid valve. The desired value of a particular type of solenoid valve may be measured and used to establish a measurement comparative table. For example, when testing the solenoid valve 100, the desired value indexed from the measurement comparative table may be input to the timer 352 for testing.

The timer unit 350 may include the timer 352 and/or a controller 354. The timer 352 may be connected to a power switch 362. The timer unit 350 may be connected to the power switch 362, the first measurement unit 342 and the second measurement unit 344. The power switch 362 may be connected to the solenoid valve 100. The power switch 362 may also be connected to the measurement unit 340 and/or the controller 354. The timer 352 may be set to measure a time interval between when the solenoid valve 100 is activated and when the solenoid valve 100 starts operating.

The controller 354 may be connected to the timer 352 and the measurement unit 340. The controller 354 may compare a measurement value obtained by the measurement unit 340 with the desired value. The controller 354 controls the timer 352 to stop when the same value as the desired value is detected from the solenoid valve 100 by the measurement unit 340.

The power supply unit 360 may include the power switch which may be connected to the solenoid valve 100 and/or the timer 352.

The valve test apparatus may test whether the solenoid valve 100 or the venturi valve 200 is operating normally. When an error or defect is detected from semiconductor manufacturing equipment equipped with a solenoid valve 100 or venturi valve 200, it may be possible to determine whether the solenoid valve 100 or the venturi valve 200 is defective by detaching the solenoid valve 100 or the venturi valve 200 from the semiconductor manufacturing equipment. The solenoid valve 100 or the venturi valve 200 may be tested to determine whether the solenoid valve 100 or the venturi valve 200 is operating normally using the valve test apparatus. Replacement of the solenoid valve 100 or the venturi valve 200 may not be necessary, reducing additional costs incurred for valve replacement. It may be possible to increase productivity by determining with minimal delay whether the solenoid valve 100 or the venturi valve 200 is operating normally.

It may be possible to more precisely measure a time interval between when the solenoid valve 100 is activated and when the solenoid valve 100 starts operating. It also may be possible to facilitate the operation of the semiconductor manufacturing equipment by removing a solenoid valve operating slowly, even when the solenoid valve is operating normally.

Figure 6:
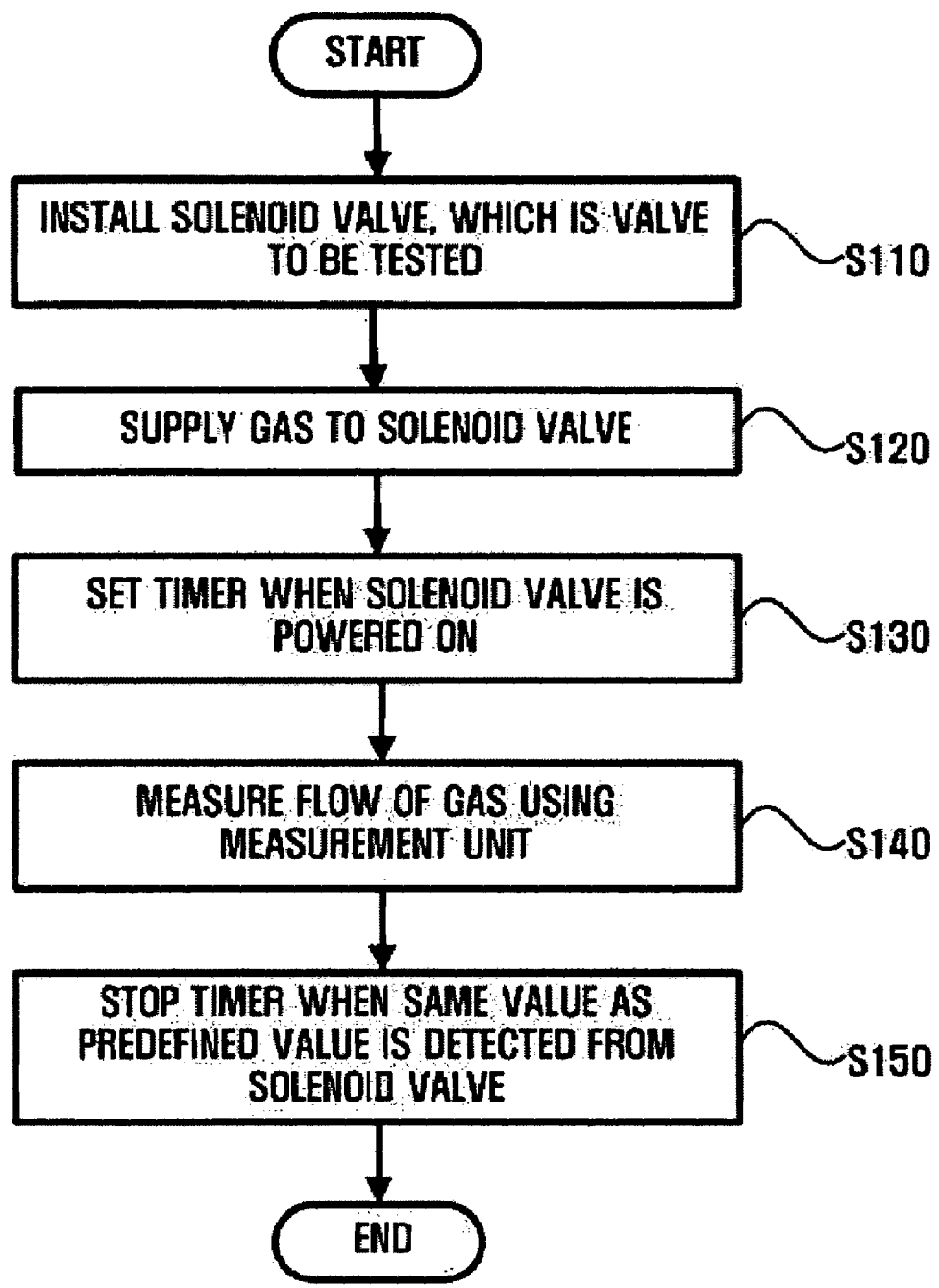

A solenoid valve test method according to an example embodiment of the present invention will now be described in detail with reference to FIGS. 3 through 6. FIG. 6 is a flowchart illustrating a solenoid valve test method using a valve test apparatus according to an example embodiment of the present invention.

Referring to FIGS. 3 through 6, in operation S110, a solenoid valve 100 to be tested may be arranged on the solenoid valve holding unit 320 of the valve test apparatus according to an example embodiment of the present invention. In operation S120, a gas may be supplied to the solenoid valve 100 by the gas supply unit 310. The gas may be pumped into the solenoid valve 100 via the gas inlet 312. The regulator 314 regulates the pressure of the gas. In operation S130, the solenoid valve 100 may be activated by turning on the power switch 362 connected to the power supply unit 360. When the power switch 362 is turned on, the timer 352, which may be connected to the power switch 362, may begin to operate.

In operation S140, when a gas is pumped into the solenoid valve 100 and discharged, the measurement unit 340 may measure the flow of the gas discharged from the solenoid valve 100.

The first measurement unit 342 in the measurement unit 340 may measure the pressure of the gas discharged from the solenoid valve 100, determining the flow of the gas discharged from the solenoid valve 100. The solenoid valve 100 may be tested by connecting the first measurement unit 342 to the solenoid valve holding unit 320.

The second measurement unit 344 in the measurement unit 340 may pass the gas discharged from the solenoid valve 100 through a venturi valve 200, which is operating normally. The second measurement unit 344 may measure the vacuum pressure inside the venturi valve 200, determining the flow of the gas discharged from the solenoid valve 100. The solenoid valve 100 may be tested by arranging the venturi valve 200 on the venturi valve holding unit 330 of the valve test apparatus, and connecting the venturi valve 200 to the second measurement unit 344.

When the gas discharged from the solenoid valve 100 passes through narrow portions of the first pipe 210 of the venturi valve 200, the gas flow may increase and the pressure may decrease. When the air pressure inside the first pipe 210 decreases, a gas filling up the second pipe 220 of the venturi valve 200 may be sucked into the first pipe 210. The air pressure inside the second pipe 220 may decrease, creating a vacuum inside the second pipe 220. The flow of the gas discharged from the solenoid valve 100 may be determined by measuring the vacuum pressure inside the second pipe 220.

A desired pressure value of the gas discharged from the solenoid valve 100 may be input to a controller 354 in a timer unit 350 in advance. A timer 352 in the timer unit 350 may be set when the power switch 362 connected to the solenoid valve 100 is turned on. In operation S150, the timer 352 may stop when the same pressure value as the desired pressure value is detected from the solenoid valve 100 by the measurement unit 340. A time interval, between when the solenoid valve 100 is turned on and when the solenoid valve 100 begins to properly discharge gas, may be measured. It may be possible to determine the amount of time for the solenoid valve 100 to begin operating based on time information provided by the timer 352. In operation S60, the detected pressure value may be compared with a plurality of pressure values included in a measurement comparative table. Based on the comparison results, it may be determined whether the solenoid valve 100 is operating normally.

When an error or defect is detected from semiconductor manufacturing equipment equipped with a solenoid valve 100 or venturi valve 200, the solenoid valve 100 or the venturi valve 200 may be detached from the semiconductor manufacturing equipment and tested using the valve test apparatus to determine whether the solenoid valve 100 or the venturi valve 200 is operating normally or defective. If the valve test apparatus determines that the solenoid valve 100 or the venturi valve 200 is operating normally, it may be determined that replacement of the solenoid valve 100 or the venturi valve 200 is not necessary, decreasing the additional costs incurred for valve replacement.

It may possible to increase productivity by determining with minimal delay whether the solenoid valve 100 or the venturi valve 200 is operating normally. It may also be possible to more precisely measure a time interval between when the solenoid valve 100 is activated and when the solenoid valve 100 starts operating. It may further be possible to facilitate the operation of the semiconductor manufacturing equipment by removing a solenoid valve operating slowly, even when the solenoid valve is operating normally.

Figure 7:
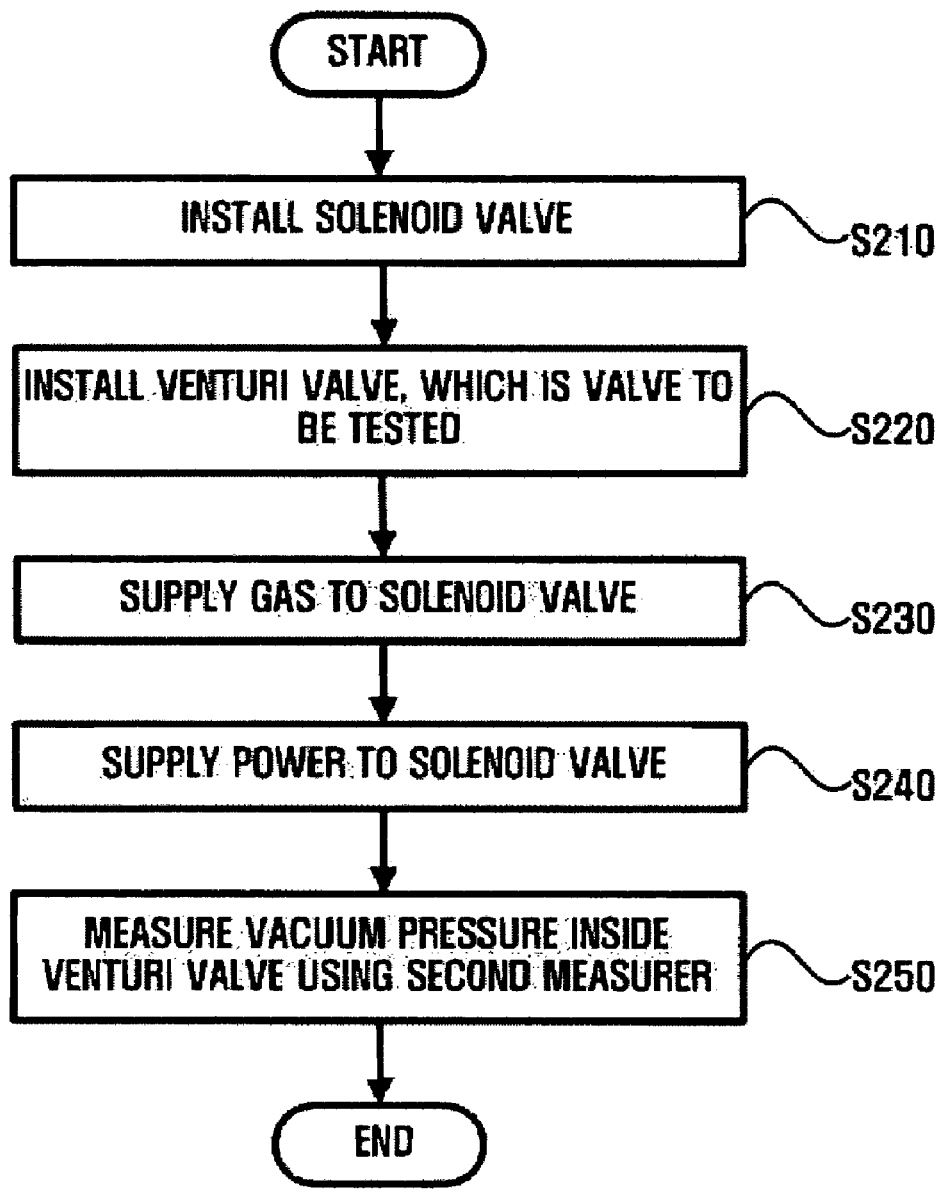

A venturi valve test method according to an example embodiment of the present invention will now be described in detail with reference to FIGS. 3, 5, and 7. FIG. 7 is a flowchart illustrating a venturi valve test method using a valve test apparatus according to an example embodiment of the present invention.

Referring to FIG. 7, in operation S210, a solenoid valve 100, which is operating normally, may be arranged on the solenoid valve holding unit 320 of the valve test apparatus according to an example embodiment of the present invention.

In operation S220, a venturi valve 200 to be tested may be arranged on the venturi Valve holding unit 340 of the valve test apparatus. The venturi valve 200 may be connected to the solenoid valve holding unit 320 and the second measurement unit 344 in the measurement unit 340.

In operation S230, a gas may be supplied to the venturi valve 200 by the gas supply unit 310. A gas may be pumped into the venturi valve 200 via the gas inlet 312. The regulator 314 may regulate the pressure of the gas. In operation 240, the solenoid valve 100 may be activated by turning on the power switch 362 connected to the power supply unit 360. A gas may be pumped into and discharged from the solenoid valve 100.

In operation S250, when the gas discharged from the solenoid valve 100 passes through the venturi valve 200, the second measurement unit 344 in the measurement unit 340 may measure the vacuum pressure inside the venturi valve 200. As the pressure of the gas passing through the first pipe 210 of the venturi valve 200 decreases, an increasing amount of gas filling up the second pipe 220 of the venturi valve 200 may be sucked into the first pipe 210, creating a vacuum inside the second pipe 210. The second measurement unit 220 may measure the vacuum pressure inside the second pipe 210.

The valve test apparatus may more precisely determine whether the venturi valve 200 is operating normally (e.g., whether the gas pumped into the venturi valve 200 is properly discharged). When an error or defect is detected from semiconductor manufacturing equipment equipped with a venturi valve, it may be possible to determine whether the venturi valve is defective by detaching the venturi valve from the semiconductor manufacturing equipment and testing whether the venturi valve is operating normally using the valve test apparatus. If the valve test apparatus determines that the venturi valve is operating normally, it may be determined that replacement of the venturi valve may not be necessary, decreasing the additional costs for valve replacement. It may also be possible to increase productivity by determining with minimal delay whether the venturi valve is operating normally.

As described above, an apparatus for testing a valve, a solenoid valve test method and a venturi valve test method according to the example embodiments of the present invention provides at least the following advantages.

It may be possible to increase efficiency and/or productivity by determining whether or not the solenoid valve or the venturi valve is operating normally.

Because the valve test apparatus decreases the likelihood of replacing a solenoid valve or a venturi valve when the solenoid valve or the venturi valve is not defective, it may be possible to decrease additional costs incurred for valve replacement.

It may be possible to facilitate the operation of the semiconductor manufacturing equipment by removing a solenoid valve operating slowly, even when the solenoid valve is operating normally.

The foregoing is illustrative of the example embodiments of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims.

What is claimed is:

1. A valve test apparatus comprising:
   a gas supply unit;
   a solenoid valve holding unit connected to one end of the gas supply unit;
   a first measurement unit connected to the solenoid valve holding unit;
   a venturi valve holding unit on which a venturi valve is arranged, the venturi valve being selectively connected to the solenoid valve holding unit and the first measurement unit;
   a second measurement unit connected to the venturi valve; and
   a timer unit which measures a time interval between when a solenoid valve is activated and when a value measured by the first measurement unit or the second measurement unit is equivalent to a desired value.

2. The valve test apparatus of claim 1, wherein the first measurement unit is a pressure measurement unit which measures the pressure of gas discharged from the solenoid valve, as a valve to be tested, arranged on the solenoid valve holding unit; or
   the second measurement unit is a vacuum pressure measurement unit which measures the vacuum pressure inside the venturi valve arranged on the venturi valve holding unit when the gas discharged from the solenoid valve passes through the venturi valve, which operates normally.

3. The valve test apparatus of claim 1, wherein the second measurement unit is a vacuum pressure measurement unit which measures the vacuum pressure inside the venturi valve, as a valve to be tested, arranged on the venturi valve holding unit when the gas discharged from the solenoid valve, which operates normally, passes through the venturi valve.

4. The valve test apparatus of claim 1, wherein the gas supply unit supplies gas to the solenoid valve and regulates the pressure of the gas.

5. The valve test apparatus of claim 1, wherein the timer unit includes a timer which is set as soon as the solenoid valve is activated and a controller which controls the timer to stop when the measured value is equivalent to the desired value.

6. The valve test apparatus of claim 5, wherein the timer is connected to a power switch, the first measurement unit and the second measurement unit; and the power switch is connected to the solenoid valve holding unit.

7. A solenoid valve test method using the apparatus of claim 1, including arranging the solenoid valve, as a valve to be tested, on the solenoid valve holding unit; enabling the gas supply unit to supply gas to the solenoid valve; measuring a flow of gas discharged from the solenoid valve; and measuring the time interval between when the solenoid valve is activated and when the measured value, which is equivalent to the desired value, is detected from the solenoid valve.

8. The solenoid valve test method of claim 7, measuring the time interval includes setting a timer as soon as the solenoid valve is activated; and controlling the timer to stop when the measured value, equivalent to the desired value, is detected from the solenoid valve.

9. The solenoid valve test method of claim 7, wherein measuring the flow of the gas includes measuring the pressure of gas discharged from the solenoid valve arranged on the solenoid valve holding unit; or measuring the vacuum pressure inside the venturi valve, which operates normally, arranged on the venturi valve holding unit when the gas discharged from the solenoid valve passes through the venturi valve.

10. The solenoid valve test method of claim 7, wherein enabling the gas supply unit to supply gas includes maintaining the pressure of the gas.

11. A venturi valve test method using the apparatus of claim 1, including arranging the solenoid valve, which operates normally, on the solenoid valve holding unit; arranging the venturi valve, as a valve to be tested, on the venturi valve holding unit; enabling the gas supply unit to supply gas to the solenoid valve; and measuring the vacuum pressure inside the venturi valve when gas discharged from the solenoid valve passes through the venturi valve.

12. The venturi valve test method of claim 11, wherein enabling the gas supply unit to supply gas includes maintaining the pressure of the gas.

* * * * *

UNITED STATES PATENT AND TRADEMARK OFFICE
CERTIFICATE OF CORRECTION

PATENT NO.         : 7,401,494 B2                                             Page 1 of 1
APPLICATION NO.    : 11/490128
DATED              : July 22, 2008
INVENTOR(S)        : Soo-Min Kim, Ho-Sung Eum and Jang-Wan Cho It is certified that error appears in the above-identified patent and that said Letters Patent is hereby corrected as shown below:

Title page, item (54) should read
-- (54)   VALVE TEST APPARATUS, SOLENOID VALVE TEST METHOD AND VENTURI VALVE TEST METHOD --

Signed and Sealed this

Second Day of December, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,401,494 B2 |
| APPLICATION NO. | : 11/490128 |
| DATED | : July 22, 2008 |
| INVENTOR(S) | : Soo-Min Kim, Ho-Sung Eum and Jang-Wan Cho |

It is certified that error appears in the above-identified patent and that said Letters Patent is hereby corrected as shown below:

Title page, item (54) and Column 1, line 1, should read
-- (54)  VALVE TEST APPARATUS, SOLENOID VALVE TEST METHOD AND VENTURI VALVE TEST METHOD --

This certificate supersedes the Certificate of Correction issued December 2, 2008.

Signed and Sealed this

Twenty-third Day of December, 2008

JON W. DUDAS
*Director of the United States Patent and Trademark Office*